(No Model.)
D. A. RITCHIE.
SHEET METAL PIPE.
No. 308,800. Patented Dec. 2, 1884.
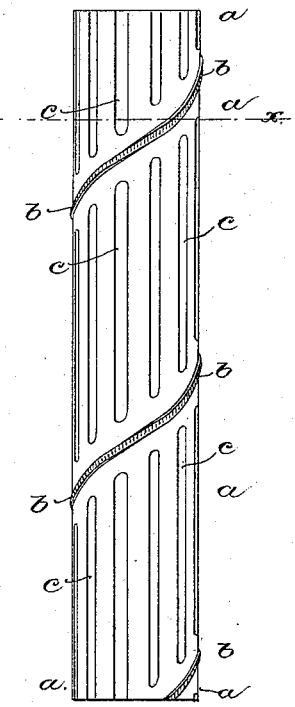
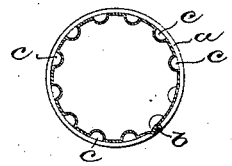
Witnesses.
John F. C. Prinkert
Henry Marsh
Inventor
David A. Ritchie
by Crosby Gregory
attys

UNITED STATES PATENT OFFICE.

DAVID A. RITCHIE, OF CHELSEA, MASSACHUSETTS.

SHEET-METAL PIPE.

SPECIFICATION forming part of Letters Patent No. 308,800, dated December 2, 1884.

Application filed March 7, 1884. (No model.)

*To all whom it may concern:*

Be it known that I, DAVID A. RITCHIE, of Chelsea, county of Suffolk, State of Massachusetts, have invented an Improvement in Sheet-Metal Pipe, of which the following description, in connection with the accompanying drawings, is a specification, like letters on the drawings representing like parts.

This invention relates to that class of pipe which is composed of a spiral strip of sheet metal, and has for its object not only to stiffen that class of pipe, but also to reduce its liability to burst when liquid within it becomes frozen.

My invention consists in a pipe composed of a spirally-wound strip of sheet metal having its contiguous edges overlapped or united to form a spiral joint or seam, the body of the pipe between the different rounds of the said spirally-arranged joint or seam being corrugated or indented, substantially as will be described.

Figure 1 in elevation represents a piece of sheet-metal pipe embodying my invention; Fig. 2, an end view thereof; and Fig. 3 is a section on the dotted line $x\ x$.

In this my invention a strip or ribbon, $a$, of sheet metal is wound spirally to form a pipe, and the contiguous overlapping or abutting edges of the said strip are arranged to form a spiral joint, $b$, which extends around the said pipe, as represented in the drawings. That part of the body of the pipe between the different rounds of the spirally-arranged joint $b$ is corrugated or indented, as at $c$, and, as shown, the said corrugations extend nearly across the strip $a$, but do not cross the said joint. The corrugations or indentations are and will be so shaped as not only to stiffen the pipe, but also to afford opportunity for the thin metal to move outwardly in the event of the contents of the pipe becoming frozen.

The pipe herein represented may be formed on a machine substantially such as described in United States Patent No. 128,911, it having added to it other devices especially devised for the purpose of corrugating or indenting the body of the pipe, as illustrated and described in another application, No. 129,541, filed April 28, 1884, by me, to which reference may be had.

I have shown a form of joint known as a "lock-seam;" but instead of it I may use any well-known form of sheet-metal joint suitable for the purpose.

I claim—

As an improved article of manufacture, a pipe composed of a strip of sheet metal spirally wound, and having its edges overlapped or joined to form a spiral joint or seam, and corrugated or indented between the different rounds of the said joint or seam, substantially as described.

In testimony whereof I have signed my name to this specification in the presence of two subscribing witnesses.

DAVID A. RITCHIE.

Witnesses:
   HENRY W. LAMB,
   GEORGE M. RICHARDSON.